(12) United States Patent
Gary, Jr.

(10) Patent No.: US 12,027,863 B2
(45) Date of Patent: Jul. 2, 2024

(54) DOMESTIC APPLIANCE HAVING DEMAND-RESPONSE POWER CONSUMPTION CONTROL

(71) Applicant: WHIRLPOOL CORPORATION, Benton Harbor, MI (US)

(72) Inventor: Wyndham F. Gary, Jr., Whitefish Bay, WI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 18/202,359

(22) Filed: May 26, 2023

(65) Prior Publication Data
US 2023/0299582 A1    Sep. 21, 2023

Related U.S. Application Data

(63) Continuation of application No. 17/874,491, filed on Jul. 27, 2022, now Pat. No. 11,705,728, which is a continuation of application No. 17/245,004, filed on Apr. 30, 2021, now Pat. No. 11,437,815, which is a continuation of application No. 16/518,011, filed on Jul. 22, 2019, now Pat. No. 10,998,726, which is a
(Continued)

(51) Int. Cl.
*H02J 3/14* (2006.01)
*H02J 3/00* (2006.01)
*H02J 13/00* (2006.01)

(52) U.S. Cl.
CPC ............ *H02J 3/14* (2013.01); *H02J 3/00* (2013.01); *H02J 13/00* (2013.01); *H02J 13/00004* (2020.01); *H02J 13/00007* (2020.01); *H02J 2310/14* (2020.01)

(58) Field of Classification Search
CPC ...... H02J 3/14; H02J 3/00; H02J 13/00; H02J 2310/14; H02J 13/00007; H02J 13/00004
See application file for complete search history.

(56) References Cited

U.S. PATENT DOCUMENTS 6,906,617 B1    6/2005    Van der Meulen
8,106,541 B1    1/2012    Sarullo
(Continued)

OTHER PUBLICATIONS

Treacy, Megan; "New Smart Meter Technology Can Tell Your Appliances Apart"; http://www.treehugger.com/clean-technology/new-smart-meter-can-tell-your-appliances-apart.html; Apr. 9, 2012; 5 pages.
(Continued)

*Primary Examiner* — Robert L Deberadinis
(74) *Attorney, Agent, or Firm* — McGarry Bair PC

(57) ABSTRACT

A power control device for an electrically powered appliance may selectively switch off one 110-volt input (of two separate 110-volt input lines) of a 220-volt power supply to the appliance during certain periods of operation, in response to a demand-response request. This may adjust operation of one or more components of the appliance, thus adjusting an amount of power consumed by the appliance. A determination of which one, of the two, 110-volt input lines to be switched off may be made based on an analysis of the amount of power consumed by each of the two 110-volt input lines during operation of the appliance. The power control device may be provided at any point between the electrically powered appliance and a power distribution panel distributing power from an external source.

20 Claims, 8 Drawing Sheets

Related U.S. Application Data continuation of application No. 15/787,864, filed on Oct. 19, 2017, now Pat. No. 10,396,557.

(56) References Cited

U.S. PATENT DOCUMENTS

| | | |
|---|---|---|
| 8,374,729 B2 | 2/2013 | Chapel et al. |
| 8,447,541 B2 | 5/2013 | Rada et al. |
| 8,487,634 B2 | 7/2013 | Masters et al. |
| 9,013,283 B1 | 4/2015 | Tackaberry |
| 10,396,557 B2 | 8/2019 | Gary, Jr. |
| 2004/0254654 A1 | 12/2004 | Donnelly et al. |
| 2012/0065796 A1 | 3/2012 | Brian et al. |
| 2013/0024385 A1 | 1/2013 | Kang |
| 2013/0030553 A1 | 1/2013 | Lee et al. |
| 2013/0318724 A1 | 12/2013 | Wong |
| 2014/0025221 A1 | 1/2014 | Chapel et al. |
| 2015/0039253 A1 | 2/2015 | Chen et al. |
| 2016/0111874 A1 | 4/2016 | Chapel et al. |

OTHER PUBLICATIONS

European Search Report for Counterpart EP182010819, dated Jan. 7, 2019.

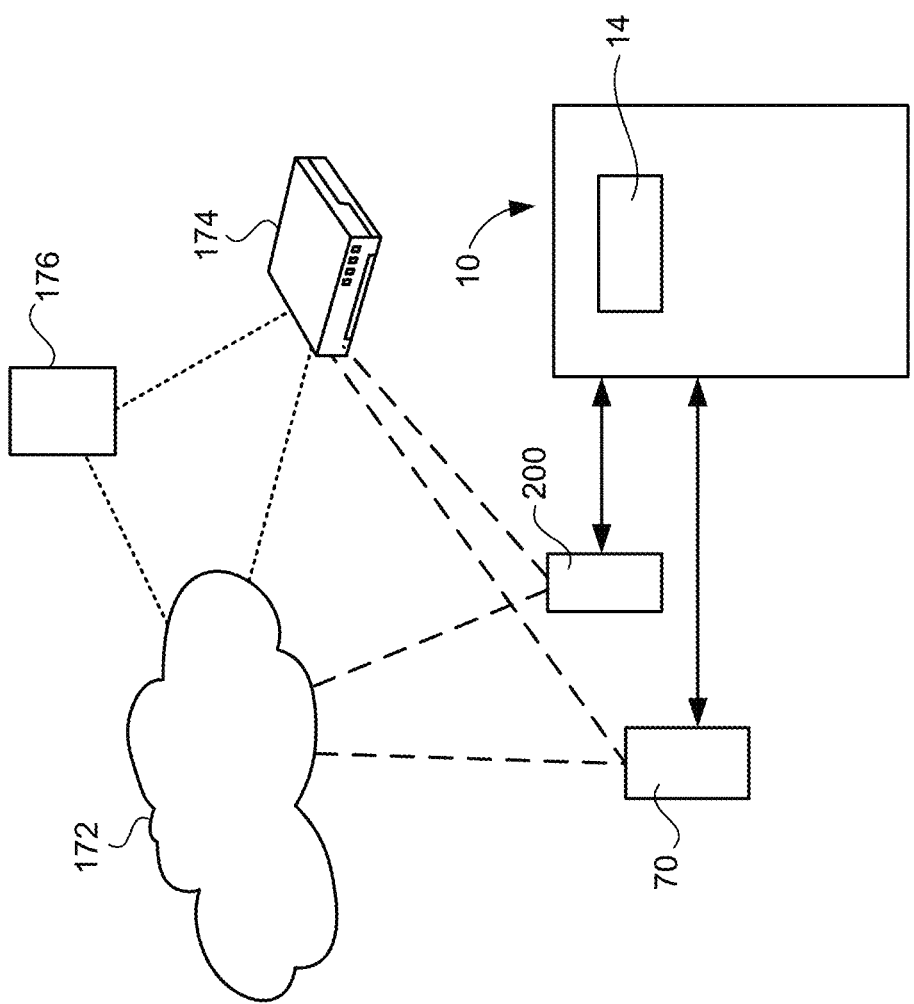

500

Perform operation cycle in normal mode
510

↓

Demand response period detected based on power information received?
520

— No →

↓ Yes

Determine revised operating parameters for operation in demand response mode
530

↓

Adjust supply of power to components based on revised operating parameters
540

↓

Demand response period terminated?
550

← No

↓ Yes

Resume operation in normal mode
560

↓ Yes

Operation cycle complete?
570

— No →

↓ Yes

Terminate operation
580

FIG. 4

DOMESTIC APPLIANCE HAVING DEMAND-RESPONSE POWER CONSUMPTION CONTROL

CROSS-REFERENCE TO RELATED APPLICATIONS

This application is a continuation application of U.S. patent application Ser. No. 17/874,491, filed Jul. 27, 2022, now U.S. Pat. No. 11,705,728, issued Jul. 18, 2023, which is a continuation application of U.S. patent application Ser. No. 17/245,004, filed Apr. 30, 2021, now U.S. Pat. No. 11,437,815, issued Sep. 6, 2022, which is a continuation application of U.S. patent application Ser. No. 16/518,011, filed Jul. 22, 2019, now U.S. Pat. No. 10,998,726, issued May 4, 2021, which is a continuation application of U.S. patent application Ser. No. 15/787,864, filed Oct. 19, 2017, now U.S. Pat. No. 10,396,557, issued Aug. 27, 2019, all four of which are hereby incorporated by reference in their entirety.

FIELD

This relates, generally, to the operation and control of domestic appliances.

BACKGROUND

Domestic appliances, such as, for example, washing machines, dryers, dishwashers, ovens/ranges and the like may receive power from an external source to perform a selected cycle of operation. A controller may be operably connected with various components of such an appliance, to execute selected cycles of operation.

SUMMARY

In one aspect, the present disclosure relates to an appliance configured to perform a cycle of operation. The appliance includes a power input adapted to receive a power supply through a first electrical supply line and a second electrical supply line, a first set of components electrically coupled to the first electrical supply line; and a second set of components electrically coupled to the second electrical supply line. The appliance further includes a power control device configured to receive a demand-response request from a power source of the power supply, and operate the appliance in a demand response mode based on the received demand-response request, wherein operating the appliance in a demand response mode includes a suspending a supply of power through at least one of the first electrical supply line and the second electrical supply line.

BRIEF DESCRIPTION OF THE DRAWINGS

FIG. 2C is a schematic view of an example domestic appliance in a network, in accordance with implementations described herein.

FIG. 4 is a flowchart of a method of operating a domestic appliance, in accordance with implementations described herein.

DETAILED DESCRIPTION

Figure 1:
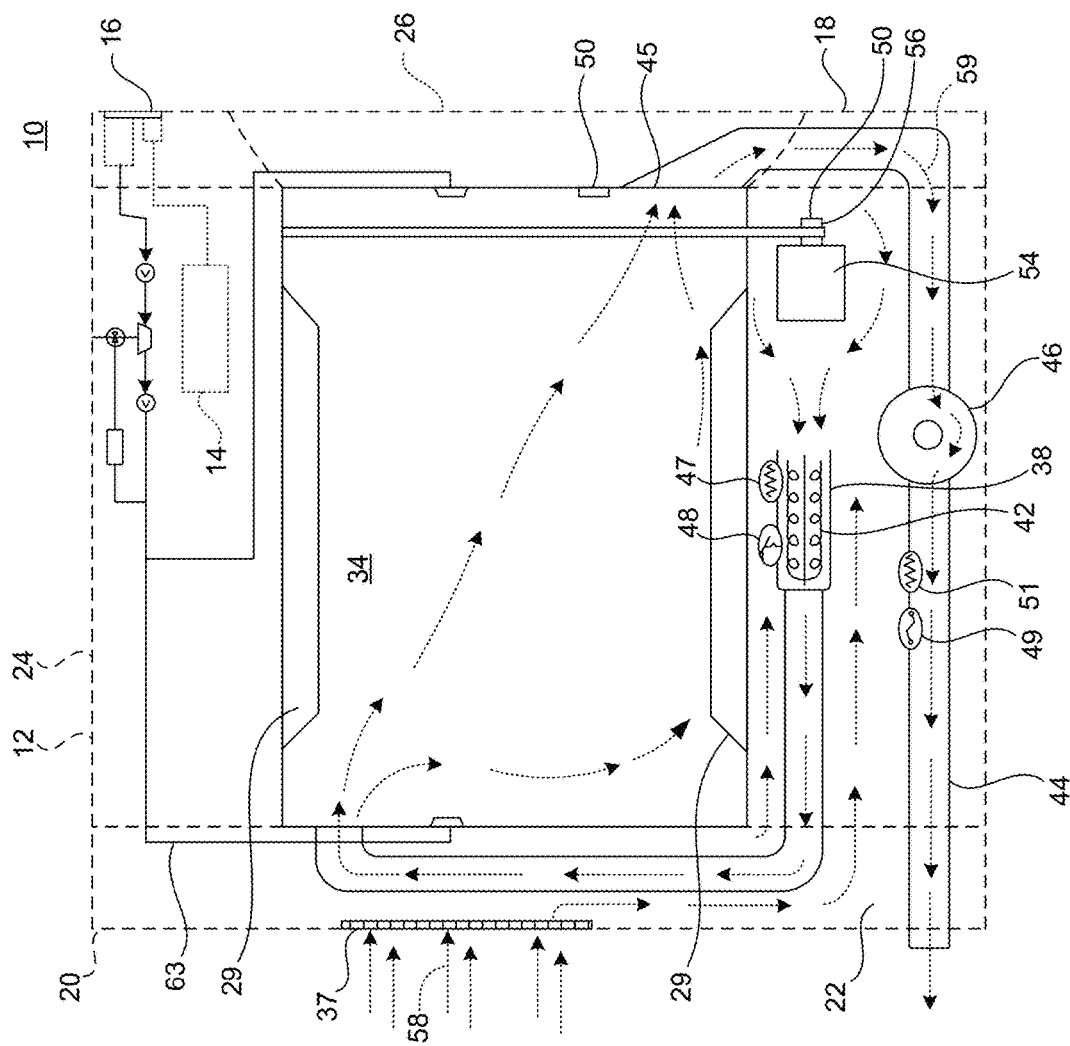
FIG. 1 illustrates an example domestic appliance, in accordance with implementations described herein.

Cost and/or availability of electric power may vary considerably, particularly during peak demand periods. In some situations, power supply companies may throttle the supply of electric power to consumers in certain areas during peak demand periods, depending on availability of power. In particular, the supply of power to certain high demand appliances, such as, for example, a heating, ventilation and air conditioning (HVAC) system, may be reduced, or temporarily suspended, during peak demand periods, in response to a demand-response request generated based on these types of conditions. This reduction, or temporary suspension, of the supply of power may allow the power supply company to meet basic needs for power across a particular region during these types of peak demand periods. However, a reduction, or temporary suspension, of power supplied to certain appliances, such as an HVAC system, may cause discomfort and inconvenience to the user, and may be generally disruptive to the user.

In a system and method, in accordance with implementations described herein, a power control device may selectively switch off one 110-volt input (of two separate 110-volt input lines) of a 220-volt power supply to an electrically powered appliance during certain periods of operation, in response to a demand-response request, to adjust an amount of power consumed by the appliance. In some implementations, which of the 110-volt input lines to be switched off may be determined based on an analysis of the amount of power consumed by each of the two 110-volt input lines.

The power control device may be positioned at any point between the electrically powered appliance and a power distribution panel distributing power received from an external source. For example, in some implementations, the power control device may be integrated into the electrically powered appliance. In some implementations, the power control device may be integrated into a power cord of the appliance. In some implementations, the power control device may be operably coupled to a portion of a power cord of the appliance, for example, an end portion of the appliance, between a plug of the appliance and a power outlet supplying power from a power distribution panel. In some implementations, the power control device may be integrated into the power outlet supplying power to the appliance via the power cord. In some implementations, the power control device may be coupled to, or integrated into, lines connecting the power outlet to a power distribution panel supplying power to the power outlet from an external source. In some implementations, the power control device may be integrated into the power distribution panel. A supply of power through the remaining, active 110-volt input line may allow the appliance to continue to operate. When operating on power supplied through the remaining, active 110-volt input line, operating parameters of the appliance may be altered to accommodate operation on power supplied through the single 110-volt input line.

FIG. 1 illustrates an example of a domestic appliance 10, in the form of an exemplary laundry treating appliance 10, and in particular, an exemplary dryer 10, in accordance with implementations as described herein. Simply for ease of discussion and illustration, concepts will be described in relation to the operation of a domestic appliance, and in particular, in terms of the exemplary laundry treating appliance 10, or dryer 10, shown in FIG. 1. However, the principles to be described herein may be applied to the operation of other types of domestic appliances and industrial/commercial appliances. Principles to be described herein may be particularly applicable to appliances that consume relatively large amounts of energy during operation such as, for example, appliances including electrically powered heating elements such as, for example, electric dryers, pool and spa heaters, cooking appliances, facility battery charging systems, and the like.

As shown in FIG. 1, the dryer 10 may include a cabinet 12. The cabinet 12 may be defined by a front wall 18, a rear wall 20, a top wall 22, and left and right lateral side walls (not shown in FIG. 1). A door 26 may be rotatably coupled to the front wall 18, and may be selectively movable between an opened position and a closed to selectively provide access to the interior of the cabinet 12. A rotatable drum 28 may be disposed within the interior of the cabinet 12. A treating chamber 34 receiving laundry items for treatment may be defined in the drum 28. The drum 28 may include one or more baffles 29. The baffle(s) 29 may be located along an inner circumferential surface of the drum 28 to facilitate movement of the laundry items within the drum 28 as the drum 28 rotates. The drum 28 may be operably coupled with a motor 54 to selectively rotate the drum 28 during a cycle of operation. In some implementations, the motor 54 may indirectly drive the drum 28, for example, by a belt 56 coupling an output shaft 50 of the motor 54 to a wheel/pulley on the drum 28. In some implementations, the motor 54 may directly drive the drum 28 via, for example, an output shaft 50 of the motor 54 coupled to a hub of the drum 28 (not shown in FIG. 1).

An air flow system may supply air to the treating chamber 34, and may exhaust air from the treating chamber 34. The air system may include a supply conduit 38 and an exhaust conduit 44. Ambient air may be drawn through an inlet vent 37 at a first end of the supply conduit 38, and may be introduced into the treating chamber 34 through an inlet grill 40 at a second end of the supply conduit 38. Air may be drawn out of the treating chamber 34 through a lint filter 45 at a first end of the exhaust conduit 44, and may be exhausted out of the dryer 10 through a second end of the exhaust conduit 44 coupled to an exhaust duct (not shown).

In some implementations, a blower 46 may be fluidly coupled to the exhaust conduit 44. Operation of the blower 46 may generate and air flow that draws air into the treating chamber 34 through the supply conduit 38, and that discharges air from the treating chamber 34 into the exhaust conduit 44. A heating element 42 may be positioned in the air flow system, for example, within the supply conduit 38. The heating element 42 may selectively activated to selectively heat air to be supplied to the treating chamber 34.

A controller 14 may receive input from a user through a user interface 16 provided on the cabinet 12 for selecting a cycle of operation and controlling the operation of the dryer 10. In some implementations, the blower 46 and the heating element 42 may be operably coupled to and controlled by the controller 14 to perform a selected cycle of operation of the dryer 10.

In some implementations, the air system may include various sensors and other components, such as a thermistor 47, a thermostat 48, a moisture sensor 50 and the like. The thermistor 47, the thermostat 48, the moisture sensor 50, and other such components, may be positioned within the air system to monitor air temperature levels, moisture levels, humidity levels, and other such characteristics. Temperature levels and/or moisture levels sensed in this manner may be used by the controller 14 to control operation of the blower 56 and/or the heating element 42. For example, in some implementations, data provided by the thermistor 47 may be used to determine an inlet temperature. Data from a thermistor 51 and a thermal fuse 49 at the exhaust conduit 44 may be used to determine an exhaust air temperature. Data from the moisture sensor 50 positioned in the interior of the treating chamber 34 may monitor the amount of moisture of the laundry items in the treating chamber 34.

Figure 2A:
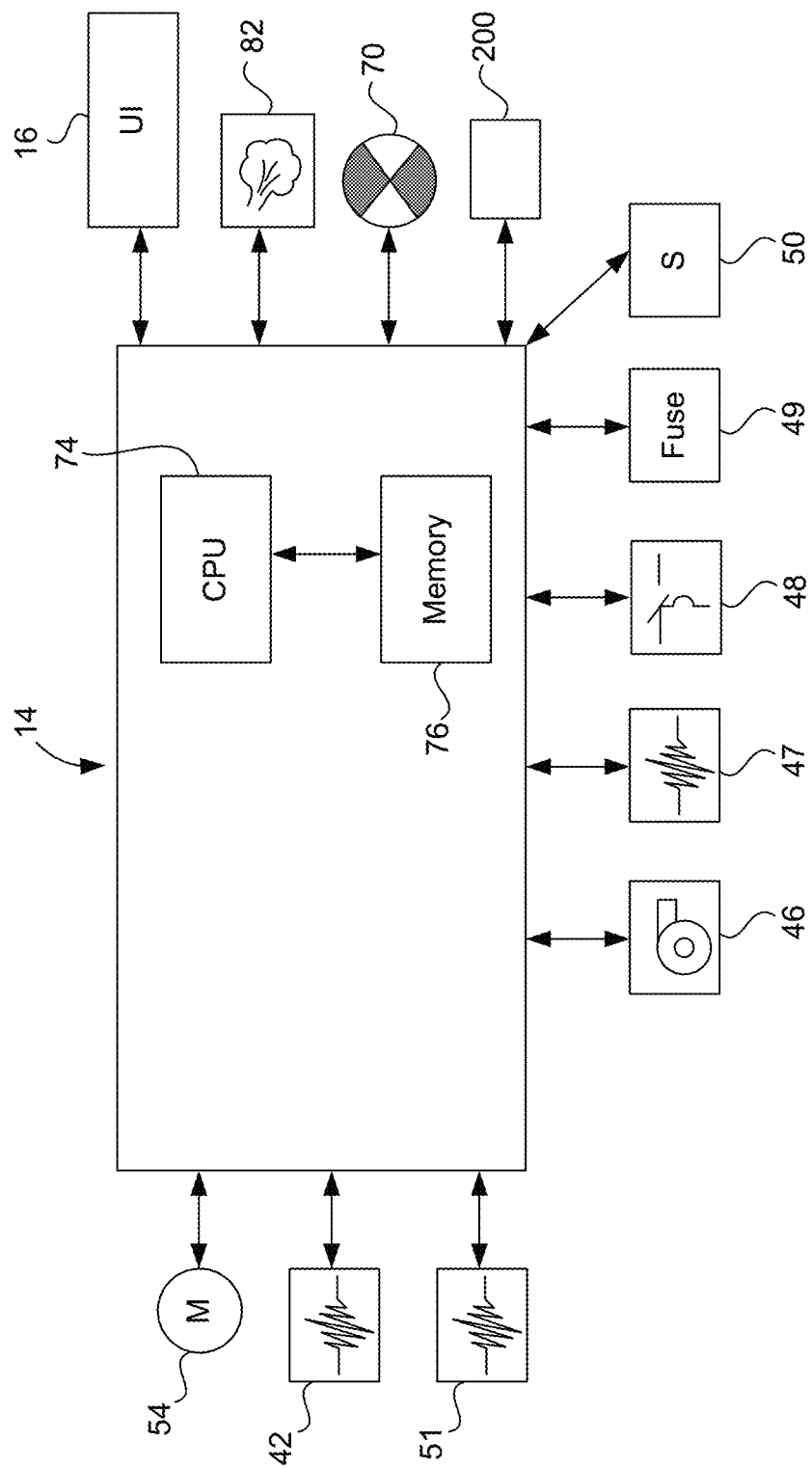
FIG. 2A is a schematic view of an example controller that may be operably coupled with a domestic appliance, in accordance with implementations described herein.

FIG. 2A is a schematic view of an example controller, such as the controller 14 described above, coupled to various components of the dryer 10. As shown in FIG. 2A, in some implementations, the controller 14 may be operably coupled to, for example, one or more of the heating element 42, the blower 46, the thermistor 47, the thermostat 48, the thermal fuse 49, the thermistor 51, the moisture sensor 50, the motor 54, and the like. The controller 14 may control one or more of these components and/or may receive input from one or more of these components. The controller 14 may be operably coupled to the user interface 16 to receive user input for implementation of a selected operational cycle, and to provide the user with information related to the operational cycle. The controller 14 may include components such as, for example, a central processing unit (CPU) 74 and a memory 76. Various treatment cycles and associated data, such as look-up tables, may be stored in the memory 76. One or more software applications, such as an arrangement of executable commands/instructions, may be stored in the memory 76, and may be executed by the CPU 74 to implement the one or more treatment cycles.

For example, to generate air flow for a selected treating cycle, the controller 14 may actuate the blower 46 to draw an inlet air flow 58 into the supply conduit 38 through the rear vent 37. The controller 14 may activate the heating element 42 to heat the inlet air flow 58 as it passes over the heating element 42, with the heated air 59 being supplied to the treating chamber 34. The heated air 59 contact the laundry items as it passes through the treating chamber 34 to remove moisture from the laundry items. The heated, and now moist, air 59 may exit the treating chamber 34, and flow through the blower 46 and the exhaust conduit 44 to the outside of the dryer 10. The controller 14 may continue to control the blower 46 and/or the heating element 42 until the cycle of operation is completed.

Figure 2B:
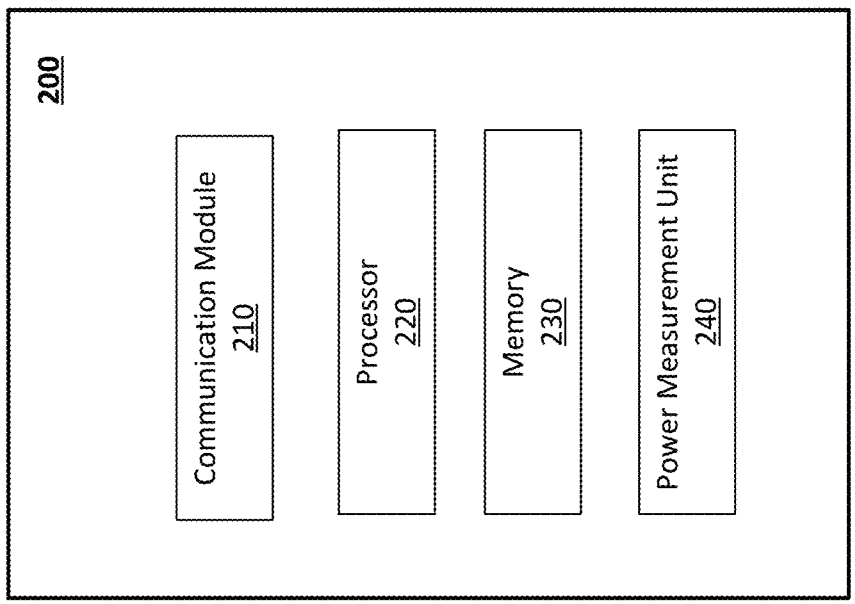
FIG. 2B is a schematic view of an example power control device operably coupled with a domestic appliance, in accordance with implementations described herein.

FIG. 2B is a schematic view of an example power control device 200, in accordance with implementations described herein. As noted above, in some implementations, the power control device 200 may be installed in, or integrated into, the domestic appliance. In some implementations, the power control device 200 may be operably coupled to a power cord of the domestic appliance. In some implementations, the power control device 200 may be integrated into a power cord of the domestic appliance. In some implementations, the capabilities of the power control device 200 may be integrated into a circuit breaker dedicated to the dryer 10 at the power distribution panel, or breaker box.

As shown in FIG. 2B, the power control device 200 may include, for example, a communication module 210, a processor 220, a memory, a power measurement unit 240, and other such components. The communication module may provide for external communication of the power control device 200 with external devices via, for example, wifi and the like. The power measurement unit 240 may measure the amount of power being consumed by each of the 110-volt input lines, under control of the processor 220, to determine which of the two 110-volt input lines is to be interrupted in response to a demand-response request as described above. The power measurement unit 240 may then provide this determination to the processor 220, and the processor 220 may store this determination in the memory 230. A demand response request may be received by the communication module 210 and forwarded to the processor 220 for implementation. In response to the demand-response request, the processor 220 may access the earlier determination from the memory 230, and implement the interruption of the flow of power through the identified 110-volt input line.

As noted above, the amount of power being consumed by each of the two 110-volt input lines may be measured, for example, by the power measurement unit 240, to determine which one, of the two lines, is to have the flow of power interrupted in response to a demand-response request. In some implementations, this process may be carried out by an algorithm executed by the processor 220 based on information provided by the power measurement unit 240, to determine which of the two 110-volt input lines is to have the flow of power interrupted in response to a demand-response request. In some implementations, this determination may be made, and stored in the memory 230, for implementation upon receipt of a demand-response request. In some implementations, this determination may be made at the first initiation of an operational cycle after power is applied to the domestic appliance 10 (for example, when the first operational cycle is initiated after the domestic appliance 10 is connected to a source of power and the domestic appliance goes from an unplugged to a plugged-in state, reinstatement of power after a loss of power and the like). In some implementations, this determination may be confirmed each time a new operational cycle is initiated.

As shown in FIGS. 2A and 2C, in some implementations, the controller 14 may also be operably coupled with a wireless communication link 70. This may allow the appliance 10 to exchange information via a wireless network. The wireless communication link 70 may include, but is not limited to, packet radio, satellite uplink, Wireless Fidelity (WiFi), WiMax, AeroMACS, Bluetooth, ZigBee, 3G wireless signal, code division multiple access (CDMA) wireless signal, global system for mobile communication (GSM), 4G wireless signal, long term evolution (LTE) signal, Ethernet, or any combinations thereof. The particular type or mode of wireless communication is not critical to implementation of the principles to be described herein, and later-developed wireless networks are certainly contemplated. By way of non-limiting example, the appliance 10 may communicate via the wireless network with an internet based cloud 172, or via a router 174 with an external device 176. In some implementations, the external device 176 may be in a different physical location from the appliance. For example, in some implementations, the external device 176 may be an external remote server. In some implementations, the external device 176 may be in the same physical location as the appliance 10 (for example, in the same home). The external device 176 may be a device having processing and communication capability including, for example, a computer, a mobile device, a server and the like. The device 176 may include communication link capable of communicating with other systems and devices.

The controller 14, the cloud 172, and/or the device 176 may include a computer program or application, or any portion thereof, having an executable instruction set for executing the operation of the appliance 10. The application may include machine-readable media for carrying or having machine-executable instructions or data structures stored thereon. Such machine-readable media may be any available media, which can be accessed by a general purpose or special purpose computer or other machine with a processor. Generally, such a computer program may include routines, programs, objects, components, data structures, algorithms, etc., that have the technical effect of performing particular tasks or implement particular abstract data types. Machine-executable instructions, associated data structures, and programs represent examples of program code for executing the exchange of information as disclosed herein. Machine-executable instructions may include, for example, instructions and data, which cause a general-purpose computer, special-purpose computer, or special-purpose processing machine to perform a certain function or group of functions.

In some implementations, a 220-volt power supply line supplying power to the dryer 10 may include a first 110-volt input line supplying power to a first set of components of the dryer 10, and a second 110-volt input line supplying power to a second set of components of the dryer 10. In some implementations, power may be supplied through both the first 110-volt input line and the second 110-volt input line. This may allow all of the components of the dryer 10 (both the first set of components and the second set of components) to receive electrical power for execution of a cycle of operation of the dryer 10. In some implementations, power may be supplied only through the first 110-volt input line. This may cause the first set of components of the dryer 10 to receive electrical power through the first 110-volt input line, while electric power supply through the second 110-volt input line to the second set of components of the dryer 10 is suspended, for example, temporarily suspended. Consequently, operation of the second set components of the dryer 10 may be suspended during periods where electrical power is not supplied through the second 110-volt input line. Selective operation of the first set of components/suspension of operation of the second set of components of the dryer 10 in this manner may allow the dryer 10 to continue to operate, while consuming a reduced amount of power.

For example, as noted above, the supply of electric power to consumers may be controlled, or reduced, during periods in which cost and/or availability of electric power is at a premium, for example, during peak demand periods. The ability to implement, and adapt to, this reduction in the amount of power at the consumer end in an effective manner, and with relatively minor impact to the consumer, may benefit the consumer, as well as the external power supply source. That is, a power control device, in accordance with implementations described herein, may receive power related information from an external source, indicating a demand response power reduction request, and may selectively control the supply of power to an appliance, for example, a relatively high energy demand appliance such as the dryer 10 described above, based on previously set power parameters. This may be implemented by, for example, selectively controlling the supply of power delivered to the appliance via a 220-volt power supply source. That is, this may be implemented by, for example, selectively supplying power through both the first and second 110-volt input lines of the 220-volt power supply, or through only the first 110-volt input line of the 220-volt power supply, as described above, based on the previously set power parameters. By de-energizing one of the two 110-volt input lines of the 220-volt power supply, one operable portion of the appliance may be de-energized and operation thereof suspended while de-energized, to reduce the amount of power consumed by the appliance. The remaining 110-volt input line of the 220-volt power supply main remain energized, so that another operable portion (for example, remaining operable portions) of the appliance may remain energized and operable. In response to a notification that a demand response power reduction period has ended, the power control device may re-energize the first of the two 110-volt input lines to resume the supply of power to the first operable portion of the appliance, and resume normal operation of the appliance.

The following example will be explained in terms of the exemplary dryer 10 described above, simply for ease of discussion and illustration. However, as noted above, the principles to be described may be applied to the operation and control of other appliances which receive electrical power through a 220-volt power supply.

As illustrated in the example shown in FIGS. 3A-3F, electric power may be conveyed from an external electric power source (such as, for example, a power utility company or other such entity) to an electric powered appliance, such as the exemplary dryer 10, to provide power to operate the dryer 10. The dryer 10 may include a power cord 150 connected to a 220-volt power supply source 100, for example, a power outlet 100. The power outlet 100 may convey power, for example, 220-volt power including first and second 110-volt input lines as described above, from an external power source and power distribution panel 400 to the dryer 10. A power control device 200 may selectively control the flow of power to the dryer 10. For example, as described above, during normal operation, the power control device 200 may allow power to be supplied to the dryer 10 through both the first and second 110-volt input lines. During operation in the demand response mode, the power control device 200 may allow power to be supplied through a first of the 110-volt input lines, while (temporarily) suspending the supply of power through a second of the 110-volt input lines.

Figure 3B:
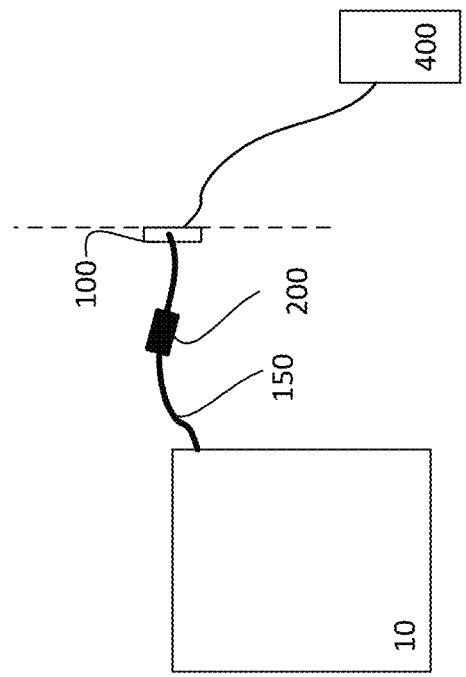
FIGS. 3A-3F illustrate exemplary positioning of a power control device relative to a domestic appliance, in accordance with implementations described herein.
Figure 3A:
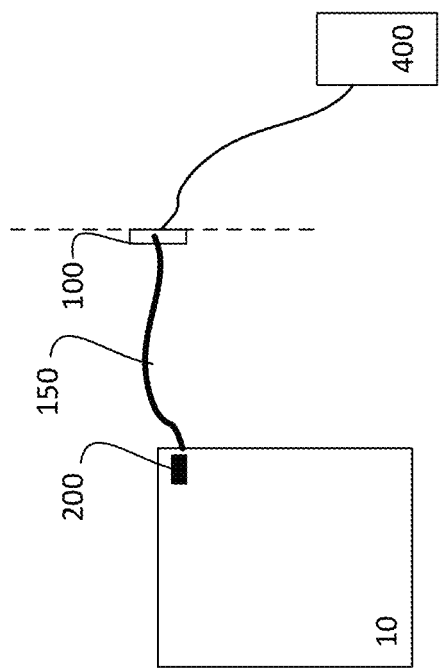
Figure 3D:
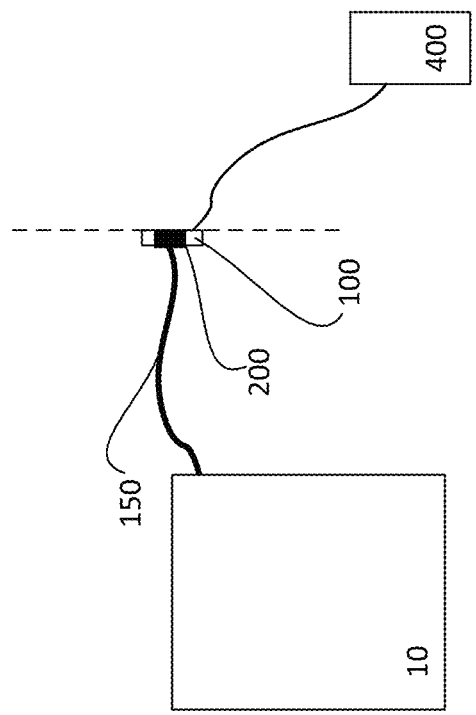
Figure 3C:
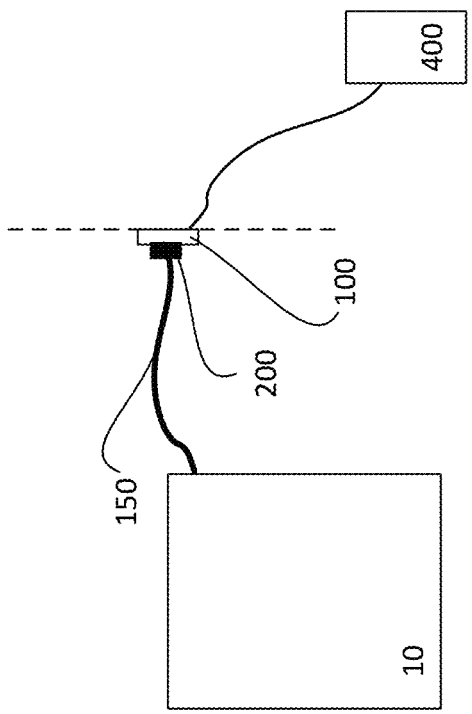
Figure 3F:
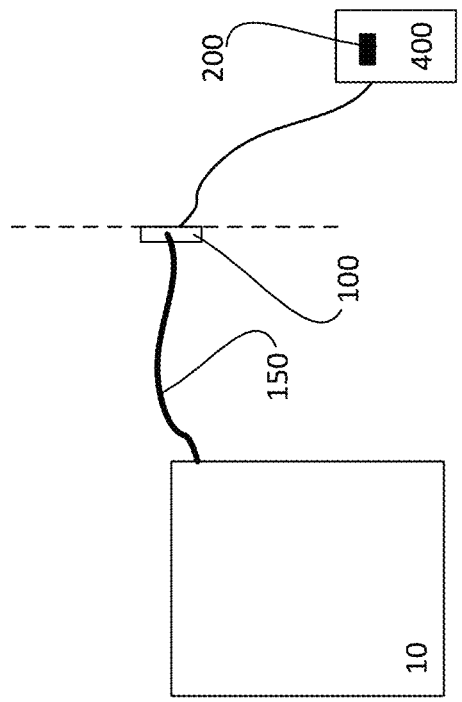
Figure 3E:
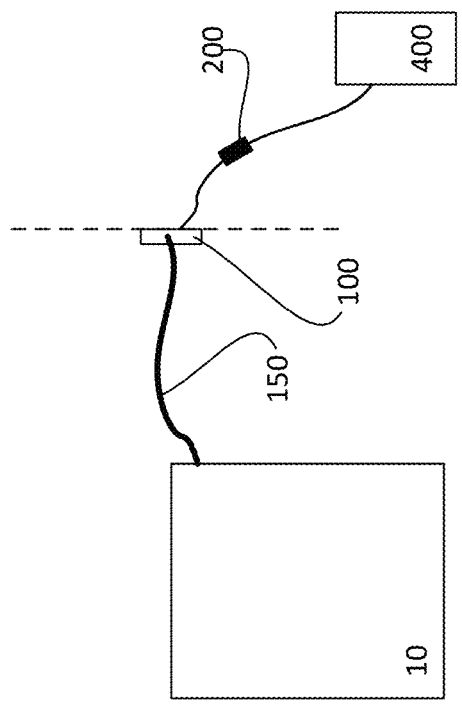

As noted above, the power control device 200 may be positioned at any point between the dryer 10 and the power distribution panel 400. For example, in some implementations, the power control device 200 may be integrated into the dryer 10 and operably coupled to the controller 14, as shown in FIG. 3A. In some implementations, the power control device 200 may be operably coupled to, or integrated into, the power cord 150 of the dryer 10, as shown in FIG. 3B. In some implementations, the power control device 200 may be coupled between the power cord 150 and the power outlet 100, as shown in FIG. 3C. In some implementations, the capabilities of the power control device 200 may be integrated into the power outlet 100, as shown in FIG. 3D. In some implementations, the power control device 200 may be operably coupled to, or integrated into, lines connecting the power outlet 100 and the power distribution panel 400, as shown in FIG. 3E. In some implementations, the capabilities of the power control device 200 may be integrated into a circuit breaker dedicated to the dryer 10 at the power distribution panel 400, or breaker box 400, as shown in FIG. 3F.

Regardless of the positioning of the power control device 200 relative to the dryer 10 and/or the power cord 150 and/or the power outlet 100 and/or the external power source and/or the power distribution panel 400, the power control device 200 may be programmed to selectively control the supply of power to the dryer 10 to operate the dryer 10 in the demand response mode in response to certain external parameters and/or external inputs. During normal operation (for example, a full power mode), the power control device 200 may supply power to the dryer 10 through both the first 110-volt input line and the second 110-volt input line. This may allow all of the components of the dryer 10 to receive power, and may allow all of the components of the dryer 10 to operate in accordance with operational commands from the controller 14.

When operating in the demand response mode, or power saving mode, the power control device 200 may supply power to the dryer 10 through the first 110-volt input line, while suspending (temporarily suspending) power supplied through the second 110-volt input line. This may suspend the supply of power to the second set of components of the dryer 10, with the second set of components remaining in an off state, or a standby state, while the supply of power through the second 110-volt input line is suspended. In this arrangement, the first set of components of the dryer 10 may receive power (continue to receive power), and may operate (continue to operate) in accordance with operational commands from the controller 14.

In some implementations, the second set of components, whose operation is suspended when operating in the demand response mode, may include one or more components which consume relatively high levels of power. In the exemplary dryer 10 discussed above, this may include, for example, the heating element 42, which may consume relatively high amounts of power when compared to other components of the dryer 10. The first set of components, whose operation is maintained when operating in the demand response mode, may include one or more components which consume relatively low levels of power. In the exemplary dryer 10 discussed above, the motor 54 may continue to rotate the drum 28, and the blower 46 may continue to circulate air through the chamber 34. The power control device 200 may be capable of determining, for example, based on previously set parameters, or programmed parameters, which of the two 110-volt input lines supplies power to component(s) to be suspended in the demand response mode (i.e., which of the two 110-volt input lines is to supply power to the heating element 42 of the dryer 10), and which of the two 110-volt input lines supplies power to component(s) be maintained in the demand response mode (i.e., which of the two 110-volt input lines is to supply power to the remaining components of the dryer 10).

In this example, operation in this manner in the demand response mode may maintain freshness of items received in the chamber 34 at a significantly reduced power consumption level. That is, in this example, unheated/room temperature air continues to circulate through the chamber 34 as the drum 28 continues to rotate (with the heating element 42 in the off state), maintaining freshness of the items received in the chamber 34 and eventual drying of the items in the chamber 34, at a significantly reduced level of power consumption. For example, in some configurations, operation of the heating element 42 may consume approximately ten times the power consumed by the remaining components of the dryer 10. In some configurations, operation of the electric dryer 10 may consume approximately twice the amount of energy consumed by an air conditioner operating for the same amount of time. Thus, operation of the dryer 10 in the demand response mode, and corresponding suspension of operation of the heating element 42, may yield a significant decrease in energy consumption. This may provide relatively great benefit when faced with peak demands, possible brown outs and the like, with relatively little impact to the consumer. The greater and greater amounts of appliance data usage available (due to, for example, a greater number of connected appliances in use) may allow usage to be more accurately predicted, incentives for usage in reduced power modes and/or during certain usage periods to be implemented, and power consumption to be leveled for a more consistent supply of electric power.

In some implementations, the power control device 200 may operate the dryer 10 in an immediate demand response mode. The immediate demand response mode may be implemented in response to an immediate/imminent peak demand. In this situation, the immediate/imminent peak demand may be outside normally predicted high cost/high demand periods due to, for example, uncharacteristically high usage in a particular region, equipment failures related to the external power source and the like. In some implementations, the power control device 200 may operate the dryer 10 in a scheduled demand response mode. The scheduled demand response mode may be implemented based on historically known high cost/high demand periods and/or upcoming predicted high cost/high demand periods. This may allow the user to plan usage around these known/predicted periods, and/or consciously choose to operate the dryer 10 in the demand response mode. In some implementations, the power control device 200 may operate the dryer 10 in a time of use demand response mode. This may allow the dryer 10 to automatically be operated in the demand response mode when, for example, a cost of power exceeds a previously set threshold, and/or may allow a user to consciously schedule usage of the dryer 10.

Thus, the power control device 200 may be programmed to operate the dryer 10 in the demand response mode, or power saving mode, at set times of day and/or set days of the week/days of the year, for example, at times corresponding to set peak demand periods/periods exceeding a set demand level and/or high cost periods/periods exceeding a set cost. In some implementations, the power control device 200 may control the supply of power to the dryer 10 in accordance with power information received from an external source. This power information may include, for example, current and/or predicted power demand levels, current and/or predicted power cost levels and the like. In some implementations, the power control device 200 may receive this power information from an external source such as, for example, an external manufacturer's site, a cloud based site, a source receiving information from the external power source, and the like, providing power demand and/or power cost information. In some implementations, the dryer 10 may communicate with external source(s) directly via, for example, a network router connection. In some implementations, the dryer 10 may also communicate with a user, through, for example, a previously installed application running on a previously registered personal device. This may allow a registered user, via the registered personal device, to, for example, receive alerts related to the operation of the dryer 10 via the application, monitor the operation of the dryer 10 using the application, and approve and/or override operation of the dryer 10 in the demand response mode, suspend operation of the dryer 10, and the like. In some implementations, for example, in a configuration in which the power control device 200 is integrated into the dryer 10, the user may receive alerts and monitor the operation of the dryer 10, and approve and/or override operation of the dryer 10 in the demand response mode via, for example, the user interface 16 of the dryer 10.

A method 500 of operating a domestic appliance, such as the exemplary dryer 10 described above, is shown in FIG. 4. The dryer 10 may operate in the normal mode to perform a selected operation cycle (block 510). In the normal mode, power may be supplied and available to all of the components of the dryer 10, including the heating element 42 in the case of a heated drying cycle. A demand response period may be detected, based on power information received from an external source (block 520). As described above, a demand response period may be detected based on information related to peak power demand periods, peak power cost periods, power demand and/or power cost exceeding a previously set threshold, and the like. Revised operating parameters, for operation of the dryer in the demand response mode, may be determined (block 530), and the supply of power to various components of the dryer 10 may be adjusted based on the revised operating parameters, to operate the dryer in the demand response mode (block 540). As described above, depending on the operation cycle being performed, the revised operation parameters may include suspension of a supply of power to one or more components of the dryer 10. For example, in the demand response mode, the power control device may suspend a supply of power through a first 110-volt input line of a 220-volt power supply to suspend operation of one or more high consumption components of the dryer 10, such as, for example, the heating element. In the demand response mode, the power control device may maintain the supply of power through a second 110-volt input line of the 220-volt power supply, to maintain operation of remaining components of the dryer 10. These remaining components may include, for example, the motor, the blower, the control panel and other such components, to maintain air circulation through the drum of the dryer 10 and movement of items within the drum of the dryer 10. In response to a determination that the demand response period has ended (block 550), operation of the dryer 10 in the normal mode may be resumed (block 560) until it is determined that the operation cycle has been completed (block 570) and operation is terminated (block 580).

As noted above, a power control device, in accordance with implementations as described herein, may be capable of radio communication, regardless of installation position, which may allow the power control device to receive current and updated power related information from an external source, as well as user commands for operation and control of the appliance. A power control device, in accordance with implementations as described herein, may provide for operation of the appliance in a demand response mode, based on the power related information. A power control device, in accordance with implementations as described herein, may be positioned at any point between the appliance and a power distribution panel distributing power, from an external source, to the appliance. When operating in the demand response mode, the power control device may suspend the supply of power to one or more components of the appliance, while maintaining the supply of power to remaining components of the appliance. The power control device may suspend the supply of power to the one or more components, and maintain the supply of power to remaining components, by suspending the flow of power through one 110-volt input line of a 220-volt power supply, while maintaining the flow of power through the other 110-volt input line of the 220-volt power supply. Operation in the demand response mode may significantly reduce the amount of power consumed by the appliance, without significantly impacting the consumer.

While the invention has been specifically described in connection with certain specific embodiments thereof, it is to be understood that this is by way of illustration and not of limitation, and the scope of the appended claims should be construed as broadly as the prior art will permit. It should also be noted that all elements of all of the claims may be combined with each other in any possible combination, even if the combinations have not been expressly claimed.

What is claimed is:

1. An appliance configured to perform a cycle of operation, the appliance comprising:
   a power input adapted to receive a power supply through a first electrical supply line and a second electrical supply line;
   a first set of components electrically coupled to the first electrical supply line;
   a second set of components electrically coupled to the second electrical supply line; and
   a power control device configured to receive a demand-response request from a power source of the power supply, and operate the appliance in a demand response mode based on the received demand-response request, wherein operating the appliance in a demand response mode includes a suspending a supply of power through at least one of the first electrical supply line and the second electrical supply line.

2. The appliance of claim 1, wherein the demand-response request includes a demand-response power reduction request from an external utility source supplying electrical power to the appliance.

3. The appliance of claim 1, wherein the suspending the supply of power through at least one of the first electrical supply line and the second electrical supply line includes maintaining a supply of power through the other of the first electrical supply line or the second electrical supply line.

4. The appliance of claim 3, wherein the demand-response request includes a power reduction request while the first set of components is in an energized state and the second set of components is in an energized state; and wherein suspending the supply of power through at least one of the first electrical supply line and the second electrical supply line includes transitioning at least one of the first electrical supply line and the second electrical supply line from the energized state to a de-energized state in response to the power reduction request, and maintaining the other of the at least one of the first electrical supply line and the second electrical supply line in the energized state.

5. The appliance of claim 4, wherein the maintaining the other of the at least one of the first electrical supply line and the second electrical supply line in the energized state continues a partial treatment, based on the cycle of operation, of items received in a treatment chamber of the appliance.

6. The appliance of claim 3, wherein the demand-response request is further related to a power supply need across a region served by the power source.

7. The appliance of claim 3, wherein the demand-response request is further related to a power supply peak demand period.

8. The appliance of claim 1, wherein the power control device is configured to determine an electrical power consumption level associated with each of the first electrical supply line and the second electrical supply line during the cycle of operation; and
   identify the at least one of the first electrical supply line and the second electrical supply line to suspend a supply of power therethrough based on the determined electrical power consumption levels.

9. The appliance of claim 8, wherein the power control device is configured to identify the at least one of the first electrical supply line and the second electrical supply line to suspend a supply of power therethrough includes identifying an electrical supply line, of the first electrical supply line and the second electrical supply line, that consumes a greatest amount of electrical power while performing the cycle of operation.

10. The appliance of claim 1, wherein operating the appliance in the demand response mode further includes suspending a supply of power through the electrical supply line, of the first electrical supply line and the second electrical supply line, that consumes the greatest amount of electrical power while performing the cycle of operation.

11. The appliance of claim 1, wherein the suspending the supply of power through at least one of the first electrical supply line and the second electrical supply line is performed by at least one of the appliance, a power control device coupled to the appliance, a cable coupled to the appliance, a power control device coupled to an electrical socket providing electricity to the appliance, an electrical socket providing electrical power to the appliance, or a power control device installed at, in or in conjunction with, a circuit breaker or fuse panel controlling a flow of power to the appliance.

12. The appliance of claim 1, wherein the first electrical supply line and the second electrical supply line form a 220-volt circuit, and the first electrical supply line forms a 110-volt circuit.

13. The appliance of claim 1, wherein the first electrical supply line and the second electrical supply line are electrically coupled to a first electrical supply main and a second electrical supply main, respectively, configured to supply power from a power source.

14. The appliance of claim 13, wherein the power control device is further configured to operate the appliance in a demand response power reduction mode based on the received demand-response request, including switching one of the first electrical supply main or the second electrical supply main to an off-state to de-energize one of the first set of components or the second set of components, and maintaining the other of the first electrical supply main or second electrical supply main in an on-state to maintain an energized state of the other of the first set of components or second set of components.

15. The appliance of claim 14, wherein the power control device is further configured to detect a demand response power reduction end notification, and in response to the demand response reduction end notification, switch one of the first electrical supply main or the second electrical supply main to an on-state, and maintain the other of the first electrical supply main or second electrical supply main in the on-state.

16. The appliance of claim 13, wherein an amount of energy consumed by the first set of components during a cycle of operation is greater than an amount of energy consumed by the second set of components during the cycle of operation.

17. The appliance of claim 13, wherein the power control device is configured to determine an amount of electrical power consumed by the first electrical supply main and an amount of electrical power consumed by the second electrical supply main during the cycle of operation.

18. The appliance of claim 16, wherein the power control device is configured to determine the power consumed by the first electrical supply main and the second electrical supply main at least in part by identifying which of the first electrical supply main and the second electrical supply main consumes a greatest amount of electrical power during the cycle of operation, and switching off the one of the first electrical supply main and the second electrical supply main that uses the greatest amount of energy in response to the demand-response request.

19. The appliance of claim 18 further comprising a power measurement unit configured to measure an amount of power consumed by each of the first electrical supply line and the second electrical supply line.

20. The appliance of claim 18, wherein the appliance comprises at least one of an electric dryer, a pool heater, a spa heater, an oven, a range or a home battery charging system.

* * * * *